(12) United States Patent
Naito et al.

(10) Patent No.: US 6,713,979 B2
(45) Date of Patent: Mar. 30, 2004

(54) ACTUATOR DRIVE CIRCUIT

(75) Inventors: Hayato Naito, Nagano (JP); Noriaki Okada, Osaka (JP); Kazuhiko Saito, Osaka (JP)

(73) Assignees: Kabushiki Kaisha Sankyo Seiki Seisakusho, Nagano (JP); Sanyo Electric Co., Ltd., Osaka (JP)

(*) Notice: Subject to any disclaimer, the term of this patent is extended or adjusted under 35 U.S.C. 154(b) by 0 days.

(21) Appl. No.: 10/201,972

(22) Filed: Jul. 25, 2002

(65) Prior Publication Data
US 2003/0020420 A1 Jan. 30, 2003

(30) Foreign Application Priority Data

Jul. 26, 2001 (JP) .................................. 2001-226200
Dec. 26, 2001 (JP) .................................. 2001-393317

(51) Int. Cl.[7] .............................. H02P 3/14; H02H 7/09
(52) U.S. Cl. ...................... 318/280; 318/375; 318/376; 361/23; 361/33; 361/91.1
(58) Field of Search ................ 318/280, 254, 318/138, 720, 721, 722, 724, 375, 439, 376; 257/107, 111, 173, 355; 361/90, 91.1, 23.33; 324/72.5, 76.11

(56) References Cited

U.S. PATENT DOCUMENTS 4,106,069 A * 8/1978 Trautner et al. ............ 318/711
4,237,531 A * 12/1980 Cutler et al. ................ 318/805
4,446,406 A * 5/1984 Uzuka ......................... 318/254
4,704,569 A * 11/1987 Mallick et al. ............. 318/718
5,859,510 A * 1/1999 Dolan et al. ................ 318/254

FOREIGN PATENT DOCUMENTS

| JP | 57009278 A | * | 1/1982 | ........... H02P/03/18 |
| JP | 59175396 A | * | 10/1984 | ........... H02P/07/62 |
| JP | 03135323 A | * | 6/1991 | ........... H02H/07/122 |
| JP | 04046590 A | * | 2/1992 | ........... H02P/07/63 |
| JP | 04312387 A | * | 11/1992 | ........... H02P/06/02 |
| JP | 05146186 A | * | 6/1993 | ........... H02P/03/18 |
| JP | 09-182474 | | 7/1997 | |
| JP | 2001-037276 | | 2/2001 | |

* cited by examiner

Primary Examiner—Marlon T. Fletcher
Assistant Examiner—Eduardo Colon Santana
(74) Attorney, Agent, or Firm—Sughrue Mion, PLLC (57) ABSTRACT

In the invention, pairs of output transistors are provided. An actuator having an inductance is connected to nodes formed between the pairs of output transistors. A drive circuit for the actuator is arranged such that the actuator is driven by causing a drive current to flow into the inductance. The drive circuit has an overvoltage detection circuit for detecting whether or not a voltage appearing at the nodes of the output transistor pairs exceeds a supply voltage by a first predetermined level and whether or not the voltage becomes lower than a ground level by a second predetermined level. Output transistors connected to the nodes are activated by an output from the overvoltage detection circuit.

11 Claims, 7 Drawing Sheets

ACTUATOR DRIVE CIRCUIT

The present application is based on Japanese Patent Applications No. 2001-226200 and 2001-393317, the entire contents of which are incorporated herein by reference.

BACKGROUND OF THE INVENTION

1. Field of the Invention

The invention relates to an actuator having an inductance, and, more particularly, to a drive circuit for an actuator having an inductance, such as a brushless motor, a DC motor, a voice coil motor, or an electromagnetic actuator.

2. Related Art

Figure 8:
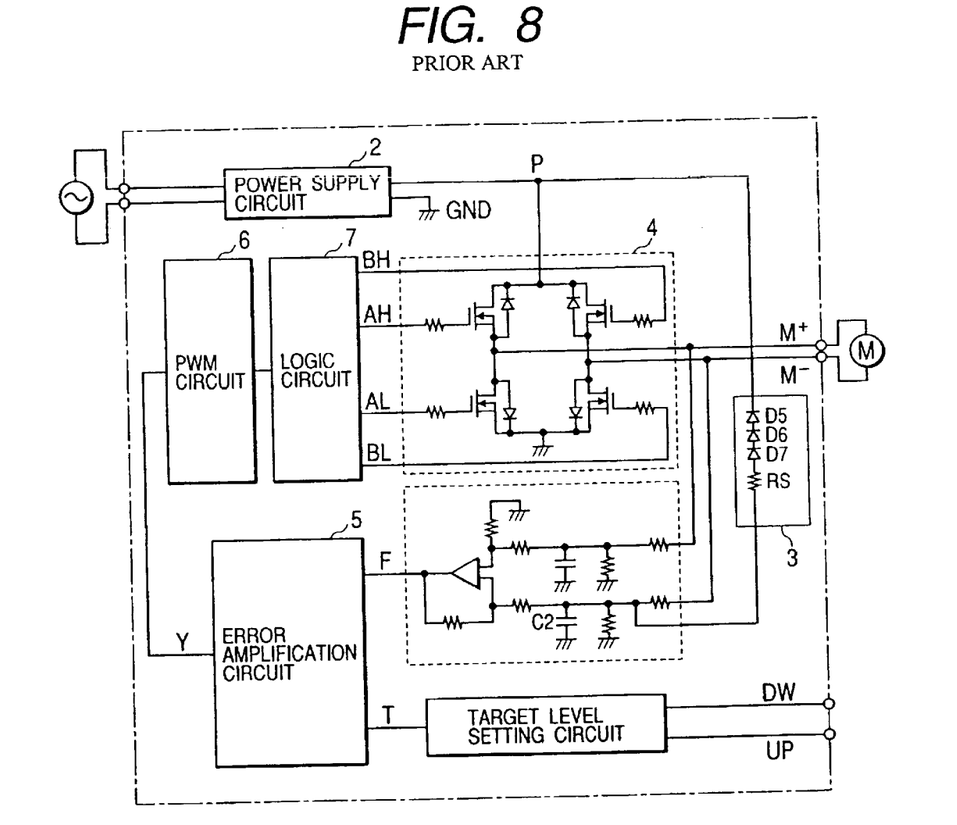
FIG. 8 is a circuit diagram showing an example of a related-art DC motor drive circuit.

Upon exposure to an external wind while remaining stationary, a fan motor using, for instance, a DC motor as a fan motor rotates in reverse, thereby producing an induced electromotive voltage. When a brisk wind arises, the fan motor rotates in reverse at high speed, whereby the resultant induced electromotive voltage becomes higher. When the voltage of a power circuit becomes anomalously higher, circuit components may become defective. For this reason, there have been proposed techniques for controlling a drive circuit, by preventing an excessive increase in the voltage of the power circuit, which would otherwise be caused by the induced electromotive voltage. The technique described in Japanese Patent Laid-open No. 2001-37276A is one such technique. FIG. 8 shows a circuit described in the foregoing publication.

As shown in FIG. 8, an H bridge circuit 4 constituted by connecting transistors in the shape of the letter H comprises two pairs of output transistors; that is, a pair of power-side output transistors and a pair of ground-side output transistors. A DC motor M is connected to a node between the two output transistor pairs. A drive current is supplied to the motor M by use of the two output transistor pairs, thereby activating the motor M. A junction P of the pair of power-side output transistors is connected to a power-circuit 2. A junction of the pair of ground-side output transistors is connected to the ground. The power circuit 2 is connected to a source voltage detection circuit 3 composed by connecting in series a plurality of Zener diodes D5, D6, and D7. The source voltage detection circuit 3 monitors a supply voltage. If the supply voltage has exceeded a predetermined level as a result of reverse rotation of the motor M, the Zener diodes D5, D6, and D7 constituting the supply voltage detection circuit 3 are brought into conduction. As a result, a current flows into a capacitor C2, thereby boosting a voltage across the capacitor C2.

A PWM circuit 6 increases the duty factor of the DC motor in the direction of forward rotation by way of an error amplification circuit 5 while an increase in the voltage across the capacitor C2 is taken as a trigger. A logic circuit 7 controls activation or deactivation of the respective output transistors of the H bridge circuit 4, thereby applying a brake to reverse rotation of the DC motor. In this way, a generated voltage of the motor M is suppressed, thereby maintaining the supply voltage at a predetermined level or less.

Japanese Patent Laid-Open No. 09-182474A describes a technique for reducing a power loss, which would arise in a drive circuit of a brushless motor when a brake is applied to reverse rotation of the motor. In the drive circuit of the brushless motor of the related-art technique, a drive coil is constituted of three phases. Three sensors are provided for the respective-phases of the drive coil, thereby switching energization; The respective sensors detect a magnetic pole of an unillustrated rotor magnet. Outputs from the respective sensors are input to a matrix circuit after having been amplified by a hole amplifier. The matrix circuit outputs a timing signal to be used for switching energization of the drive coil of three phases. The signal is input to a motor drive current output section by way of a pre-driver.

In the drive circuit, when the direction of rotation of the motor is switched during the course of rotation by switching an F/R signal, an electrical reverse brake is applied to the motor until the direction of rotation of the motor is reversed. When a reverse brake is applied to the motor, a resistor Rf detects a drive current, and a comparison circuit compares the drive current with a predetermined current limit level. When a drive current in the direction of reverse rotation has exceeded the predetermined current limit level, a switching circuit is activated, thereby deactivating the power (source) output transistor or the ground (sink) output transistor of the drive current output section through control operation. After lapse of a predetermined period of time, the output transistor is again activated through control operation. When the drive current has exceeded the current limit level, the output transistor is again deactivated through control operation. In this way, individual switching elements of the drive current output section are controlled so as to avoid becoming unsaturated, by subjecting the output transistor to PWM control when a brake is applied to the motor.

In the DC motor drive circuit, a control function, such as the PWM circuit 6, is inactive when the power circuit 2 remains deactivated. Hence, an induced electromotive voltage of the motor M cannot be suppressed. If power is shut off abruptly during the course of energization of the motor M, the drive coil-produces a counter electromotive voltage for maintaining a motor current. However, according to the related-art technique, when power is shut off, suppressing the counter electromotive voltage becomes impossible.

Specifically, according to the related-art technique, a circuit cannot be protected from an overvoltage produced by the motor unless power is active.

In the drive circuit of the brushless motor, the following problems are encountered in performing PWM control in a reverse brake mode, which has been performed under the related-art technique.

Since the drive current increases at the time of application of a brake to reverse rotation as compared with normal times, a current limit level is achieved within a shorter period of time, and the output transistor remains subjected to deactivation control for a longer period of time. If the power-side output transistor or ground-side output transistor, which is subjected to activation control, is switched to a deactivated state during the period of deactivation control operation for reasons of energization switching operation, a regenerative path for the drive current is momentarily disconnected; whereby the drive current flows in reverse to a motor power line for seeking the regenerative path.

If the motor power source has no sink (absorbing) capacity, the drive current will lose a place to flow. A sharp increase momentarily arises in the motor drive voltage, thereby exceeding the withstand voltage of the drive circuit or supply circuit. A common measure against exceeding withstand voltage is interposing an electrolytic capacitor or Zener diode between the motor supply source and the ground, thereby imparting a sink capacity to the power source. However, such a measure involves a cost hike.

Use of an electrolytic capacitor entails a problem of insufficient suppression of an increase in source voltage, for the following reasons. Specifically, at the time of a reverse rotation braking operation, the period of time during which PWN activation control is to be performed is extremely short. Hence, supply of an external current is substantially not required. Conversely, since reverse flow of the regenerative current arises frequently, a charge current much larger than a discharge current flows through the electrolytic capacitor. For this reason, the supply voltage gradually increases each time the regenerative current flows.

SUMMARY OF THE INVENTION

The invention has been conceived to solve the drawback of the related-art technique and aims at providing an actuator drive circuit having an inductance which activates the actuator by causing a drive current to flow through the inductance, wherein, even when a power supply remains inactive, a circuit can be protected against an overvoltage.

The invention also aims at providing a drive circuit for a brushless motor capable of stopping reverse flow of a regenerative current to a source line and avoiding occurrence of a rise in a supply voltage without addition of an electrolytic capacitor or a Zener diode between a motor source and the ground, by generating a path for a regenerative current which would develop at the time of a braking operation.

The invention provides a drive circuit for an actuator having an inductance, wherein the actuator is driven by causing a drive current to flow into the inductance, comprising:

two pairs of output transistors, each pair including a power-side output transistor and a ground-side output transistor, the actuator being connected to nodes formed between each pair of the power-side and ground-side output transistors;

an overvoltage detection circuit for detecting whether or not voltages appearing at the nodes formed between each pair of the power-side and ground-side output transistors are higher than a supply voltage by a first predetermined level and whether or not the voltages are lower than a ground level by a second predetermined level;

wherein one of the ground-side output transistors is activated by an output from the overvoltage detection circuit when a voltage of the node connected to the one ground-side output transistor exceeds the supply voltage by the first predetermined level, and one of the power-side output transistors is activated by an output from the overvoltage detection circuit when a voltage of the node connected to the one power-side output transistor becomes lower than the ground level by the second predetermined level.

Here, the overvoltage detection circuit includes a power-side detection transistor connected to a supply line and a ground-side detection transistor connected to a ground line; and a node formed between the power-side and ground-side detection transistors is connected to one end of the inductance of the actuator.

The actuator having the inductance according to the invention corresponds typically to any one of a brushless motor, a DC motor, a voice coil motor, and an electromagnetic actuator.

In the brushless motor drive circuit of the invention, every time a regenerative current flows through a supply line in reverse, a voltage appearing at one of motor drive coils of two arbitrary phases has inevitably jutted above a supply voltage and a voltage appearing at the other motor drive coils has also inevitably jutted below a ground level. Attention is given to this phenomenon, and the phenomenon is detected by an overvoltage detection circuit. A ground-side output transistor connected to a drive coil of phase whose voltage has jutted above the supply voltage or a power-side output transistor connected to a drive coil of phase whose voltage has become below a ground level or has jutted below the ground level by a predetermined level is forcefully activated. As a result, a regenerative current path is formed within the motor drive circuit, whereby reverse flow of an electric current to the supply line is stopped, thus inhibiting an increase in the supply voltage.

In this respect, the invention is characterized by a drive circuit for a brushless motor wherein the brushless motor is rotated by causing motor a drive current to flow into motor drive coils, comprising:

a plural pairs of output transistors, each pair including a power-side output transistor and a ground-side output transistor, different motor drive coils being connected to nodes formed between each pair of the power-side and ground-side output transistors;

an overvoltage detection circuit for detecting whether or not voltages appearing at the nodes formed between each pair of the power-side and ground-side output transistors are higher than a supply voltage by a first predetermined level and whether or not the voltages are lower than a ground level by a second predetermined level;

wherein one of the ground-side output transistors is activated by an output from the overvoltage detection circuit when a voltage of the node connected to the one ground-side output transistor exceeds the supply voltage by the first predetermined level, and one of the power-side output transistors is activated by an output from the overvoltage detection circuit when a voltage of the node connected to one power-side output transistor becomes lower than the ground level by the second predetermined level.

Further, the invention is characterized by a drive circuit for a brushless motor having a sensor for detecting a rotary position of a rotor wherein the motor is rotationally driven by causing a motor drive current to flow into motor drive coils in accordance with a position signal detected by the sensor, and a an braking operation is performed by causing a motor drive current to flow in a direction in which the motor is to be rotated in reverse, the drive circuit comprising:

a drive current detection unit for detecting the motor drive current;

a comparator for comparing a predetermined reference current value with the motor drive current value detected by the drive current detection unit;

a current control switching section for activating or deactivating a motor drive current output section in accordance with a result of comparison performed by the comparator; and an overvoltage detection circuit for detecting whether or not a voltage appearing at a terminal of the motor drive coils is higher than a supply voltage by a first predetermined level and whether or not the voltage is lower than a ground level by a second predetermined level;

wherein a regenerative current flow path is formed in the motor drive current output section by an output from the overvoltage detection circuit.

According to the invention, the motor drive coil is constituted of three phases; and the overvoltage detection circuit can be constructed so as to detect that a voltage appearing at a terminal of one motor drive coil from among two motor drive coils of two arbitrary phases is higher than the supply voltage by the first predetermined level and that a voltage appearing at the remaining motor drive coil is lower than the ground level by the second predetermined level.

DETAILED DESCRIPTION OF THE PREFERRED EMBODIMENTS

Embodiments of a circuit for driving an actuator having an inductance according to the invention will be described hereinbelow by reference to the drawings.

Figure 1:
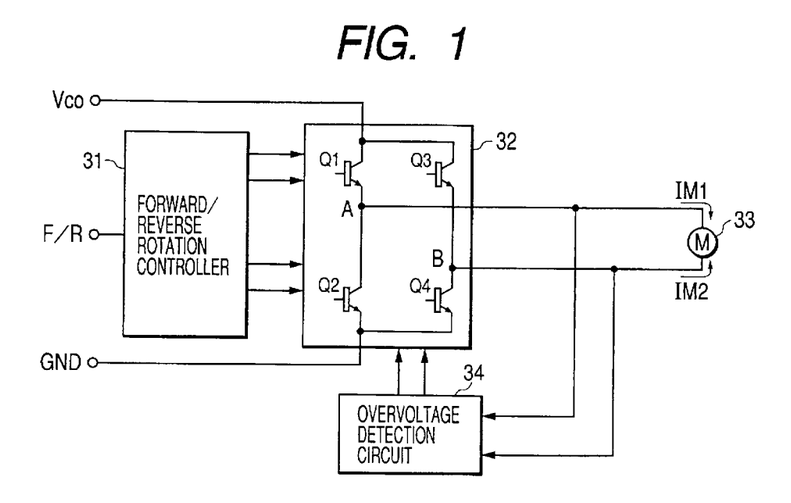
FIG. 1 is a block diagram schematically showing an embodiment of a circuit for driving an actuator having an inductance.

There will first be described an embodiment, such as that shown in FIG. 1, in which a DC motor drive circuit is employed as an actuator drive circuit according to the invention. In FIG. 1, reference numeral 32 designates a drive current output section. The drive current output section 32 is constituted of two pairs of output transistors; that is, a pair of power-side output transistors consisting of transistors Q1 and Q3; and another pair of ground-side output transistors consisting of transistors Q2 and Q4. All these transistors are of NPN type. The transistors Q1 and Q2 are connected in series, and the transistors Q3 and Q4 are connected in series. An actuator having an inductance is connected to nodes of the respective output transistor pairs; more specifically, a node A between the output transistors Q1 and Q2, and a node B between the output transistors Q3 and Q4. In the embodiment, the actuator corresponds to a DC motor 33, and the inductance corresponds to a drive coil of the DC motor 33.

Collectors of the power-side output transistors Q1, Q3 are connected to the power source, and a supply voltage Vco is applied to the collectors. Emitters of the ground-side output transistors Q2, Q4 are connected to ground (GND). In accordance with a forward/reverse instruction output from a forward/reverse rotation controller 31, the drive current output section 32 supplies a drive current for forward or reverse rotation to the DC motor by using and selectively controlling the output transistors Q1, Q2, Q3, and Q4, thereby driving the DC motor 33 so as to rotate forward or in reverse.

Both terminals of the DC motor 33 are connected to an overvoltage detection circuit 34. The overvoltage detection circuit 34 detects whether a voltage across the DC motor 33; specifically, whether a voltage developing at the node A of one output transistor pair, is higher than the supply voltage Vco or lower than the ground level by a predetermined level and whether a voltage developing at the node B of the other output transistor pair is higher than the supply voltage Vco or lower than the ground level by a predetermined level. If the voltage developing at one of the nodes A, B is higher than the supply voltage Vco by a predetermined level and the voltage developing at the remaining node is lower than the ground level by a predetermined level, the overvoltage detection circuit 34 detects the voltages, thereby activating any of the transistors in the drive current output section 32. More specifically, the ground-side output transistor Q2 connected to the node A or the ground-side output transistor Q4 connected to the node B, whichever transistor has developed a voltage greater than the supply voltage Vco by a predetermined level, is activated by an output from the overvoltage detection circuit 34. Alternatively, the power-side output transistor Q1 connected to the node A or the power-side output transistor Q3 connected to the node B, whichever transistor has developed a voltage lower than the ground level by a predetermined level, is activated by an output from the overvoltage detection circuit 34.

The operation of the embodiment will now be described. In the case of forward rotation, the forward/reverse rotation controller 31 subjects, e.g., the output transistors Q1, Q4 of the drive current output section 32, to activation control, thereby supplying, to the DC motor 33, a drive current-flowing in the direction of arrow IM1; that is, a drive current flowing from the node A to the node B. In the case of reverse rotation, the forward/reverse rotation controller 31 subjects, e.g., the output transistors Q2, Q3 of the drive current output section 32, to activation control, thereby supplying, to the DC motor 33, a drive current flowing in the direction of arrow IM2; that is, a drive current flowing from the node B to the node A.

The overvoltage detection circuit 34 detects vertical portions jutting above an inductive electromotive voltage or counter electromotive voltage developing in the drive coil of the DC motor 33; more specifically, portions jutting upward above the supply voltage Vco and portions jutting downward below the ground level GND. The ground-side output transistor connected to one of the terminals A, B whose voltage has jutted above the supply voltage Vco or the power-side output transistor connected to one of the terminals A, B whose voltage has jutted below the ground level GND is forcefully subjected to activation control. As a result, there is constituted a current path for causing a short circuit in the inductive electromotive voltage or counter electromotive voltage developing in the DC motor 33. Hence, an overvoltage developing in the drive current output section 32 can be suppressed.

Figure 2:
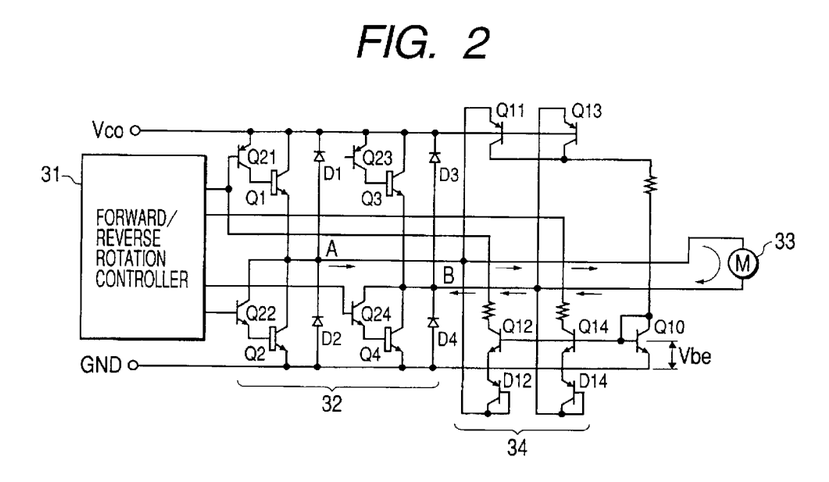
FIG. 2 is a circuit diagram showing the embodiment in greater detail.

A specific example of a circuit of the drive current output-section 32 and that of the overvoltage detection circuit 34 will be described by reference to FIG. 2. In the example circuit, the power-side output transistor connected to the terminal whose voltage has jutted below the ground level GND is forcefully subjected to activation control. First, a detailed configuration of the drive current output section 32 will be described. As described in connection with FIG. 1, the drive current output section 32 has the power-side output transistors Q1, 02 and the ground-side output transistors Q3, Q4. Both terminals of the DC motor 33 are connected to the node A existing between the transistors Q1, Q2 and the node B existing between the transistors Q3, Q4. Diodes D1, D2, D3, and D4—which cause an electric current to flow in the direction opposite that in which the electric current flows through the transistors Q1, Q2, Q3, and Q4—are connected in parallel with the transistors Q1, Q2, Q3, and Q4. The two transistor pairs; that is, the transistor pair consisting of the transistors Q1 and Q2 and the other transistor pair consisting of the transistors Q3 and Q4, constitute a forward/reverse rotation circuit for the DC motor M. The diodes D1, D2, D3, and D4 are included in the forward/reverse rotation circuit and correspond to regenerative current diodes which constitute a regenerative current path.

The output transistors Q1, Q2, Q3, and Q4 are configured so as to be activated or deactivated by the forward/reverse rotation controller 31 by way of transistors Q21, Q22, Q23, and Q24 serving as pre-drivers. More specifically, emitters and collectors of the p-n-p transistors Q21, Q23 and those of the n-p-n transistors Q22, Q24 are connected to the collectors and bases of the output transistors Q1, Q2, Q3, and Q4, respectively. The base voltages of the transistors Q21, Q22, Q23, and Q24 are controlled by the forward/reverse rotation controller 31, thereby activating or deactivating the output transistors Q1, Q2, Q3, and Q4.

The overvoltage detection circuit 34 comprises a power-side detection transistor Q11 for detecting a voltage appearing at the node A having jutted above the supply voltage; a power-side detection transistor Q13 for detecting a voltage appearing at the node B having jutted above the supply voltage; two ground-side detection transistors Q12, Q14 for detecting which of the voltage appearing at the node A and that appearing at the node B has jutted below the ground level in the same manner as that mentioned above; and two transistors D12, D14 which are connected in series with the detection transistors Q12, Q14 and act as diodes. Further, the overvoltage detection circuit 34 has a transistor Q10 whose base is connected to the bases of the respective ground-side detection transistors Q12, Q14 and which produces a voltage Vbe when a current flows through the transistor Q10 as a result of activation of any one of the two power-side detection transistors Q11, Q13. The transistor Q12 or Q14 can be activated when the voltage appearing at the node A or that appearing at the node B has jutted below the ground level while the base-emitter voltage Vbe of the transistor Q10 remains developed.

Provided that the voltage appearing at the node B has jutted above the supply voltage Vco, the transistor Q13 is activated, the current flows through the transistor Q10. As a result, the base-emitter voltage Vbe develops in the transistor Q10. When the voltage appearing at the node A has jutted below the ground level GND, the transistor Q12 and the diode D12 are brought into conduction, whereupon a collector current flows through the transistor Q12. The current activates the transistor Q21 provided in the drive current output section 32, thereby supplying a base current to the power-side output transistor Q1. As a result, the transistor Q1 is temporarily activated, and hence there is ensured a current path designated by the arrow provided in FIG. 2; that is, a current path running through the DC motor M, the node B, the diode D3, the transistor Q1, the node A, and the motor M, thereby suppressing a voltage developing in the DC motor M.

In contrast, when the voltage appearing at the node A has jutted above the supply voltage Vco, the transistor Q11 is turned on, whereupon an electric current flows into the transistor Q10, thus inducing the base-emitter voltage Vbe. Here, when the voltage appearing at the node B has jutted below the ground level GND, the transistor Q14 and the diode D14 are brought into conduction, whereupon a collector current flows through the transistor Q14. The current activates the transistor Q23 provided in the drive current output section 32, whereby a base current is supplied to the power-side output transistor Q3. As a result, the transistor Q3 is temporarily activated, thereby ensuring a current path running through the DC motor M, the node A, the diode D1, the transistor Q3, the node B, and the motor M. Thus, the voltage developing in the DC motor M is suppressed.

Such a circuit operation is maintained by a voltage produced by the DC motor M even when the terminal supplying the supply voltage Vco is open; that is, when the power is off.

Figure 3:
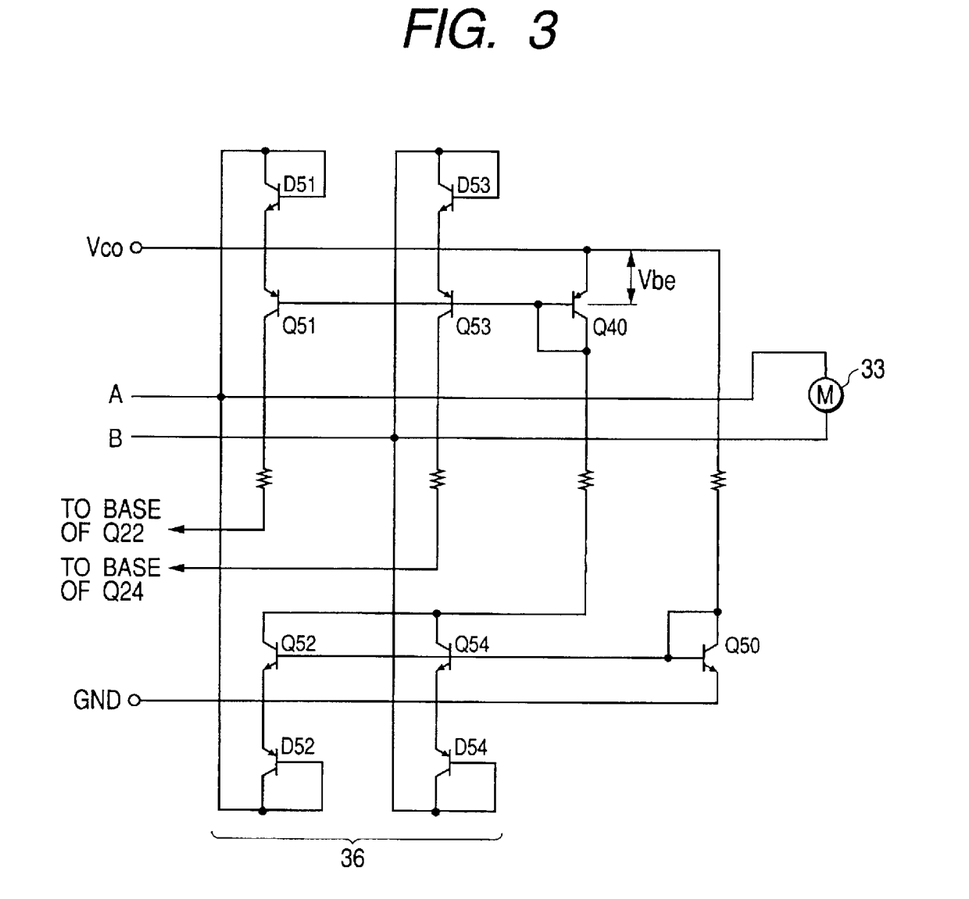
FIG. 3 is a circuit diagram showing another example of an overvoltage detection circuit applicable to the invention.

Another example of the overvoltage detection circuit applicable to the invention shown in FIG. 3 will now be described. The overvoltage detection circuit 36 subjects to, activation control, the ground-side output transistor connected to the terminal whose voltage has jutted above the supply voltage. As shown in FIG. 3, the two transistors Q51, Q53 and transistors D51, D53 serving as diodes connected in series therewith are connected to the power side of the overvoltage detection circuit. Further, two transistors Q52, Q54 and transistors D52, D54 serving as diodes connected in series therewith are connected to the ground side of the overvoltage detection circuit. Further, the overvoltage detection circuit 36 has a transistor Q40 whose base is connected to the bases of the two respective power-side transistors Q51, Q53 and which produces a voltage Vbe when an electric current flows through the transistor Q40 as a result of any one of the two ground-side transistors Q52, Q54 being turned on. In other respects, the connection of the overvoltage detection circuit is substantially identical with that of the overvoltage detection circuit exemplified in FIG. 2 such that the collector current of the transistor Q51 serves as the base current of the transistor Q22 shown in FIG. 2 and such that the collector current of the transistor Q53 serves as the base current of the transistor Q24 shown in FIG. 2.

Provided that the voltage appearing at the node A has jutted below the ground level GND, the transistor Q52 is turned on, whereupon an electric current flows into the transistor Q40. As a result, a base-emitter voltage Vbe develops in the transistor Q40. Here, when the voltage appearing at the node B has jutted above the supply voltage Vco, a transistor D53 serving as a diode and the transistor 53 are brought into conduction, whereupon a collector current flows through the transistor Q53. The current flows into the base of the transistor Q24 of the circuit shown in FIG. 2, thereby activating the transistor Q24 and supplying a base current to the ground-side output transistor Q4. As a result, the transistor Q4 is temporarily activated, thereby ensuring a current path running through the motor M, the node B, the transistor Q4, the diode D2, the node A and the motor M. Consequently; the current attempting to return to the power supply is inhibited, thereby suppressing the voltage developing in the DC motor M.

When the voltage appearing at the node B has jutted below the ground level GND, the transistor Q54 is turned on, whereupon an electric current flows through the transistor Q40. As a result, the voltage Vbe develops. When the voltage appearing at the node A has jutted above the supply voltage Vco, the diode D51 and the transistor Q51 are brought into conduction, thereby temporarily activating the transistors Q2, Q22 shown in FIG. 2. Consequently, the electric current attempting to return to the power source is inhibited, thereby suppressing the voltage developing in the DC motor M.

There has been described the example in which the actuator drive circuit has been constructed in the form of a DC motor control circuit. The object of control is not limited to a DC motor; if the object has an inductance, is rotated or moved in reverse, or is rotated forwardly anomalously, an induced electromotive voltage develops in the inductance, thereby increasing the voltage of the power circuit and deteriorating the withstand voltage of a circuit component. The drive circuit of the invention can be applied to an object of control, so long as the object is an actuator having an inductance. For instance, the object is not limited to a DC motor but may be any one of a voice coil motor and an electromagnetic actuator.

In the illustrated embodiment, the drive circuit is primarily constituted of transistors which are employed as elements for controlling a circuit. Here, the term "transistor" encompasses field-effect transistors (FETs) and all other types of transistors.

The thus-described embodiment yields the following effects.

Since the circuit operates by a counter electromotive voltage or induced electromotive voltage developing in the drive coil of the DC motor (or an inductance in the case of another actuator), generation of an overvoltage can be prevented even when the power of the drive circuit is turned off, thus preventing a voltage exceeding the withstand voltage of the drive circuit.

Even when the power of the drive circuit is alive, the overvoltage inhibition function will remain active if a counter electromotive voltage or induced electromotive voltage exceeding a source voltage has developed. Hence, an overvoltage exerted on the drive circuit can be inhibited.

Since the supply voltage is not increased by the overvoltage, the supply voltage can be increased up to the maximum withstand voltage of the drive circuit. As a result, there can be achieved a higher torque and a greater number of revolutions in the case of a motor.

Even when the power is opened during the course of energization operation, the voltage of the inductance may jut above or below the supply voltage. Provided that a regenerative current cannot return to a supply line at all, a high voltage arises momentarily, thereby exceeding the withstand voltage of the drive circuit. By the embodiment, the drive circuit operates effectively to inhibit an increase in voltage, which would otherwise be caused by unexpected handling such as that mentioned above. Hence, the drive circuit is useful as a safeguard in processes of manufacturing an actuator having an inductance.

There will now be described another embodiment in which the invention is applied to a brushless motor drive circuit while a brushless motor is used as an actuator having an inductance.

Figure 4:
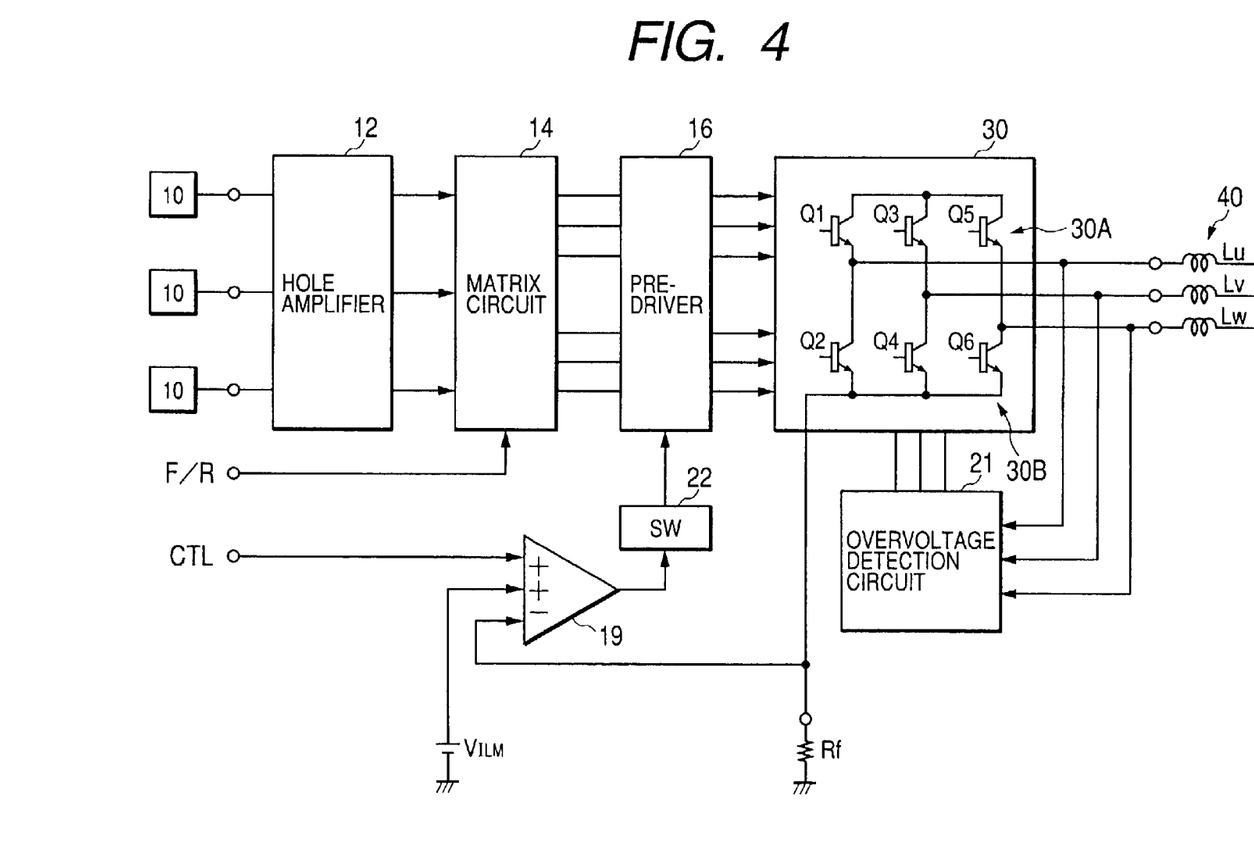
FIG. 4 is a block diagram showing an embodiment of a circuit for driving a brushless motor according to the invention.

In the embodiment shown in FIG. 4, a drive coil 40 is constituted of three phases. Three sensors 10 are provided for the respective phases of the drive coil, thereby switching energization. The respective sensors 10 detect a magnetic pole of an unillustrated rotor magnet. Outputs from the respective sensors 10 are input to a matrix circuit 14 after having been amplified by a hole amplifier 12. The matrix circuit 14 outputs a timing signal to be used for switching energization of the three-phase drive coil 40. The signal is input to a motor drive current output section 30 by way of a pre-driver 16.

In the motor drive current output section 30, three pairs of output transistors are constituted by a power-side output transistor 30A consisting of three transistors Q1, Q3, Q5, and a ground-side output transistor 30B consisting of three transistors Q2, Q4, Q6. Different motor drive coils are connected to nodes between respective transistor pairs; namely, a motor drive coil Lu is connected to a node between the transistors Q1 and Q2; a motor drive coil Lv is connected to a node between the transistors Q3 and Q4; and a motor drive coil Lw is connected to a node between the transistors Q5 and Q6. Through use of the power-side output transistor 30A consisting of the three transistors and the ground-side output transistor 30B consisting of the three transistors, a rotor of the motor is rotated by causing a motor drive current to flow to the motor drive coils Lu, Lv, Lw and switching energization.

A forward/reverse rotation instruction signal F/R is input to the matrix circuit 14. In accordance with an instruction pertaining to the direction of rotation, the matrix circuit 14 outputs energization timing signals to be sent to the respective coils belonging to the drive coil 40, by re-combination of the timing signals. A constant resistance resistor Rf serving as a drive current detection unit is connected to the ground of the drive current output section 30. A voltage proportional to the drive current arises across the resistor Rf. The voltage across the resistor Rf is input to a comparator circuit 19. The comparator circuit 19 compares the voltage across the resistor Pf with a motor control signal CTL or a current limit level $V_{ILM}$, whichever signal is lower. If the voltage across the resistor Rf is higher, the current control switching circuit 22 is activated, thereby deactivating the power-side or output-side output transistors of the drive current output section 30.

The brushless motor drive circuit is provided with an overvoltage detection circuit 21 which detects voltages appearing at nodes between the transistor pairs; namely, voltages appearing at nodes between the respective drive coils, and forcefully controls the transistors constituting the drive current output section 30 in accordance with results of detection. This, overvoltage detection circuit 21 is a novel feature of the invention. The overvoltage detection circuit 21 detects whether a voltage appearing at each node between the transistor pairs; that is, a voltage appearing at a node of each drive coil, has jutted above a supply voltage or below the ground level by a predetermined level. The overvoltage detection circuit 21 forcefully activates the power-side output transistor or ground-side output transistor connected to the coil of the phase whose voltage has jutted.

The operation of the brushless motor drive circuit of the embodiment is now be described. A rotary position of an unillustrated drive magnet is detected by the hole elements 10. The signals amplified by the hole amplifier 12 are converted into energization switching signals by the matrix circuit 14. The signals are amplified by the pre-drivers 16, and the thus-amplified signals are supplied to the drive current output section 30. A drive current is caused to flow through the motor drive coil 40.

The comparator circuit 19 compares the voltage across the resistor Rf through which the motor drive current flows with the motor control signal CTL or the current limit level $V_{ILM}$, whichever signal is lower. If the voltage of the resistor Rf is higher, the current control switching circuit 22 is activated, thereby deactivating the power-side or output-side output transistors of the drive current output section 30. As a result, the motor drive current gradually decreases. However, the output transistors are activated after lapse of a given period of time, and hence the drive current increases again. By repetition of these operations, the output transistors are subjected to PWM control.

When the forward/reverse signal F/R is switched, the motor enters a reverse braking state. Then, a large quantity of reverse drive current flows into the resistor Rf, and the period of time during which the output transistors are to be deactivated becomes drastically longer. If the power-side or ground-side output transistors, which remain active, are deactivated by energization switching operation, a regenerative path for a drive current is momentarily interrupted. As a result, the drive coils of two arbitrary phases jut above the supply voltage and below the ground level, thereby attempting to return a regenerative current to the power source.

The overvoltage detection circuit 21 detects that any of the drive coils has jutted above the supply voltage or below the ground level and forcefully activates the ground-side output transistor connected to the drive coil of the phase whose voltage has jutted above the supply voltage or the power-side output transistor connected to the drive coil of the phase whose voltage has jutted below the ground level. As a result, the regenerative current attempting to return to the power source can be suppressed.

Here, a criteria to be used for determining that a voltage has jutted may be set to the ground level, as mentioned above, or to a level lower than the ground level by a predetermined amount.

Figure 5:
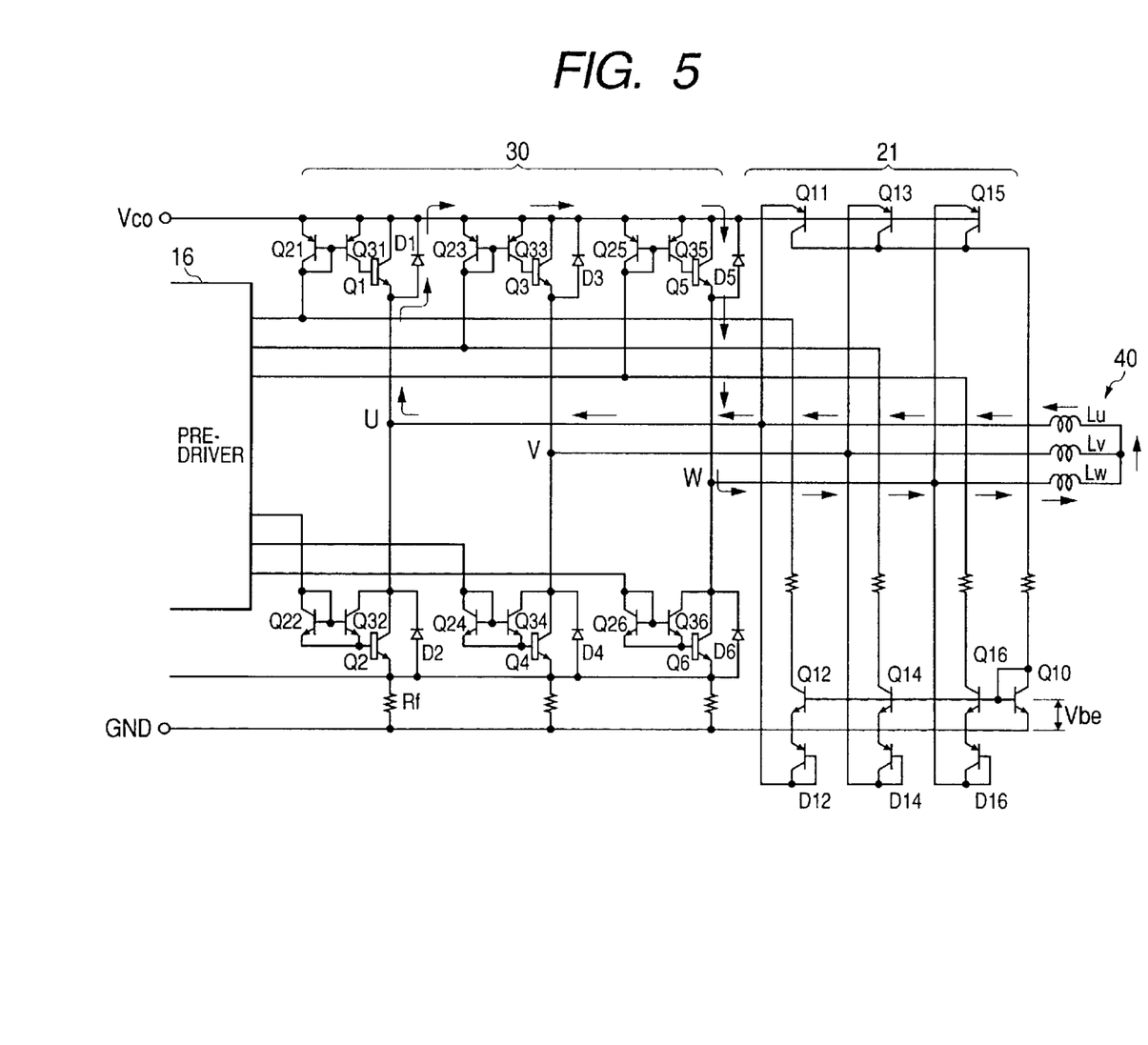
FIG. 5 is a circuit diagram showing details of a drive current output section and an overvoltage detection circuit according to the embodiment.

FIG. 5 shows a detailed circuit of the drive current output section 30 and that of the overvoltage detection-circuit 21. First, the configuration of the drive current output section 30 will be described in detail. A current mirror circuit is connected to an input side of the transistor Q1, wherein the current mirror circuit is under control of the pre-driver 16 and composed of two transistors Q21, Q31. Further, a regenerative current diode D1 is connected in parallel with the transistor Q1. Similarly, an input side of the transistor Q3 is connected to a current mirror circuit consisting of transistors Q23, Q33, and a regenerative current diode D3 is connected in parallel with the transistor Q3. An input side of the transistor Q5 is connected to a current mirror circuit consisting of transistors Q25, Q35. A regenerative current diode D5 is connected in parallel with the transistor Q5. An input side of the transistor Q2 is connected to a current mirror circuit consisting of transistors Q22, Q32. A regenerative current diode D2 is connected in parallel with the transistor Q2. An input side of the transistor Q4 is connected to a current mirror circuit consisting of transistors Q24, Q34. A regenerative current diode D4 is connected in parallel with the transistor Q4. An input side of the transistor Q6 is connected to a current mirror circuit consisting of transistors Q26, Q36. A regenerative current diode D6 is connected in parallel with the transistor Q6.

The overvoltage detection circuit 21 comprises three power-side detection transistors Q11, Q13, Q15 for detecting the voltage of any drive coil having jutted above the supply voltage; three ground-side transistors Q12, Q14, Q16 and three transistors D12, D14, D16 which are connected in series with these transistors and act as diodes; and the transistor Q10 whose base is connected to the bases of the three ground-side transistors Q12, Q14, Q16 and which produces a voltage Vbe when a current flows into the transistor Q10 as a result of any one of the three power-side transistors Q11, Q13, Q15 being turned on. The drive coil Lu of U phase is connected to a node between the transistor Q11 and the diode D12; the drive coil Lv of V phase is connected to a node between the transistor Q13 and the diode D14; and the drive coil Lw of W phase is connected to a node between the transistor Q15 and the diode D16.

Next will be described the operation of the drive current output section 30 and that of the overvoltage detection circuit 21, both being shown in FIG. 5. The circuit activates the power-side transistor connected to the drive coil of the phase whose voltage has jutted below the ground level.

Provided that an output from the drive coil Lu of U phase appearing at a node U has jutted above the supply voltage Vco, the transistor Q11 is turned on, whereupon an electric current flows into the transistor Q10. As a result, the voltage Vbe develops in the transistor Q10. When an output from the drive coil Lw of W phase appearing at a node W has jutted below the ground level GND, the transistor Q16 and the diode D16 are brought into conduction, whereupon the collector current flows through the transistor Q16. The current then flows into the current mirror circuit which is provided in the drive current output section 30 and consists of the transistors Q25, Q35, thereby supplying a base current to the power-side output transistor Q5 of W phase. As a result, the transistor Q5 is temporarily activated, thereby ensuring a regenerative current path indicated by the arrow shown in FIG. 2; namely, a regenerative current path running through the drive coil Lu, the diode D1, the transistor Q5, the drive coil Lw, and the drive coil Lu, thereby suppressing a regenerative current attempting to return to the power source.

Figure 6:
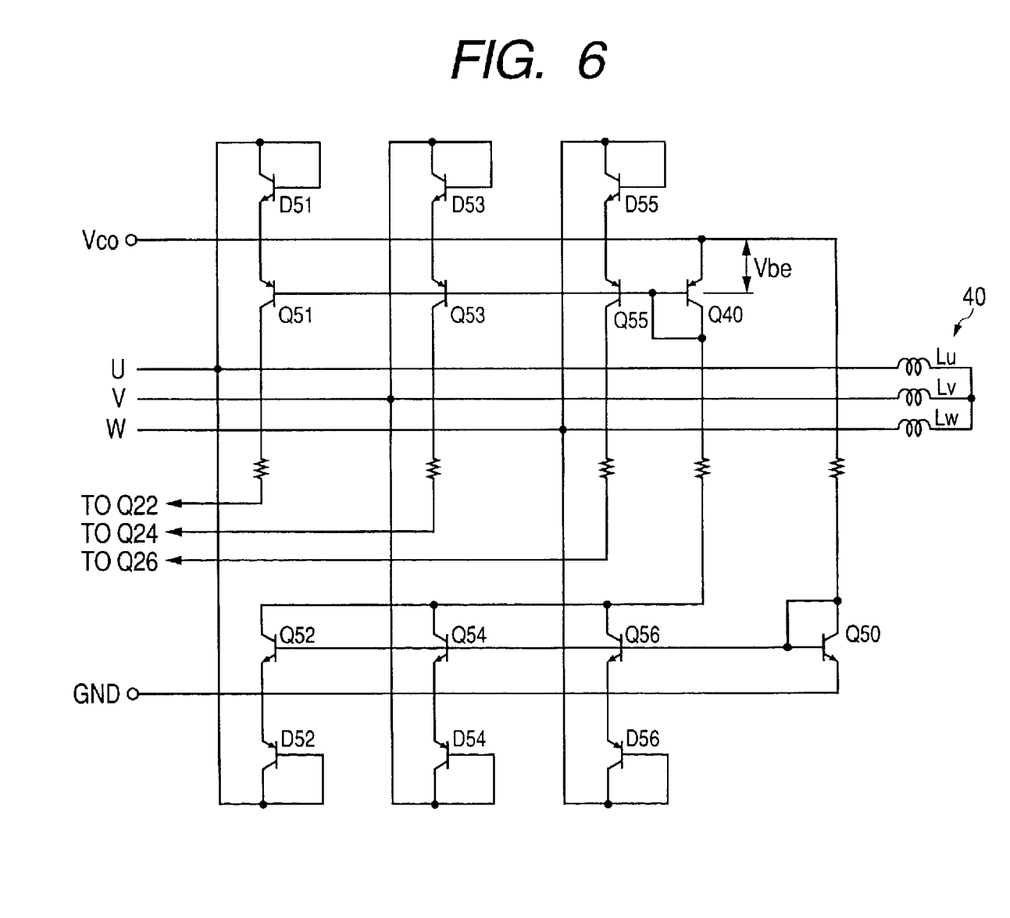
FIG. 6 is a circuit diagram showing another example of the overvoltage detection circuit applicable to the invention.

There will now be described another example of an overvoltage detection circuit applicable to a brushless motor drive circuit according to the invention shown in FIG. 6. The circuit activates the ground-side output transistor connected to the drive coil of the phase whose voltage has jutted above the supply voltage. As shown in FIG. 6, the power side of the overvoltage detection circuit is connected with three transistors Q51, Q53, Q55 and transistors D51, D53, D55 which act as diodes and are to be connected in series with the transistors. Further, the ground side of the overvoltage detection circuit is connected with three transistors Q52, Q54, Q56 and three transistors D52, D54, D56, which are to be connected in series with these transistors and act as diodes. The base side of the overvoltage detection circuit is further provided with a transistor Q40 whose base is connected to the bases of the three power-side transistors Q51, Q53, Q55 and which produces the voltage Vbe when an electric current flows through the transistor Q40 as a result of any one of the three ground-side transistors Q52, Q54, Q56 being turned on. In other respects, the connection of the overvoltage detection circuit is identical with that of the overvoltage detection circuit shown in FIG. 5.

Provided that the output from the drive coil Lu of U phase appearing at the node U has jutted below the ground level GND, the transistor Q52 is turned on, whereupon an electric current flows into the transistor Q40. As a result, the voltage Vbe develops in the transistor Q40. When the output from the drive coil Lw of W phase appearing at the node W has jutted above the supply voltage Vco, the transistor Q55 and the diode D55 are brought into conduction, whereupon the collector current flows through the transistor Q55. The current then flows into the current mirror circuit which is provided in the drive current output section 30 and consists of the transistors Q26, Q36, thereby supplying a base current to the ground-side output transistor Q6 of W phase. As a result, the transistor Q6 is temporarily activated, thereby ensuring a regenerative current path, and in turn suppressing a regenerative current attempting to return to the power source.

Figure 7:
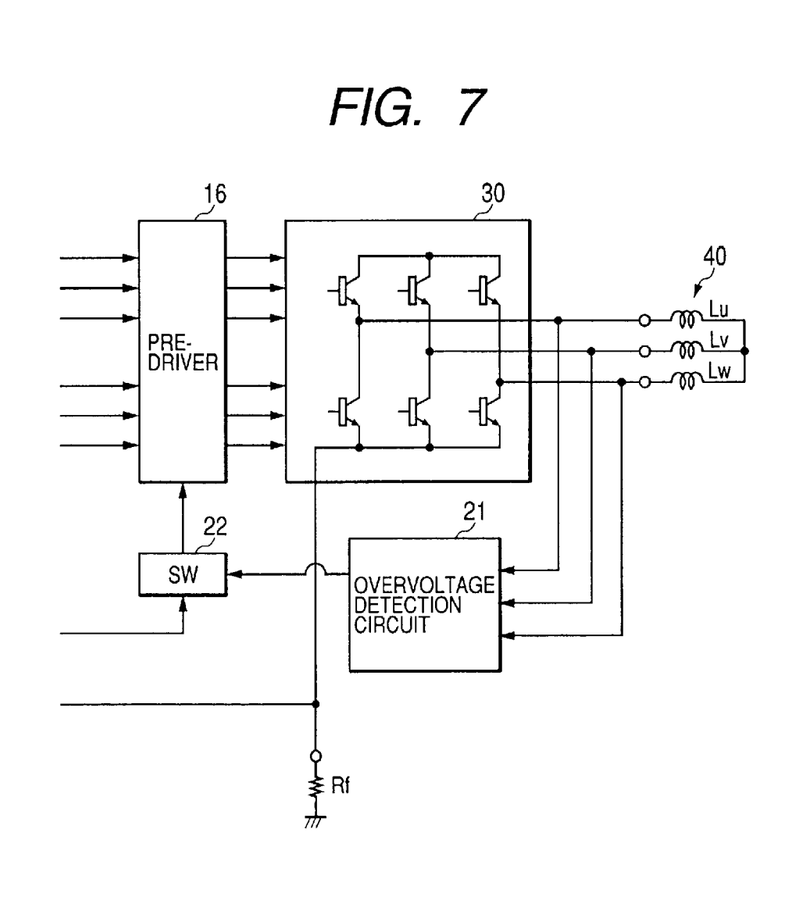
FIG. 7 is a block diagram showing a modification of an overvoltage detection circuit applicable to the invention.

FIG. 7 shows an exemplary modification of connection of the overvoltage detection circuit. When the overvoltage detection circuit 21 has detected that a voltage of any drive coil has jutted above the supply voltage or below the ground level GND, the operation of the current control switching circuit 22 is temporarily suspended. Specifically, the current control switching circuit 22 does not deactivate the power-side or ground-side output transistor of the drive current output section 30 and maintains the output transistor in an activated state. Even in this case, a regenerative current path is ensured within the drive circuit, thereby suppressing a regenerative current attempting to return to the power source.

In the case of an example connection shown in FIG. 7, when the current control switching circuit 22 subjects the power-side output transistor to activation/deactivation (PWM) control, an overvoltage detection system such as that shown in FIG. 5 is employed. In contrast, when the ground-side output transistor is subjected to activation/deactivation (PWM) control, an overvoltage detection system such as that shown in FIG. 6 is employed.

In the illustrated embodiments, a transistor has been employed as an element which is to be subjected to activation/deactivation control operation. The term "transistor" is employed for the sake of convenience of explanation. The concept of the term "transistor" encompasses a thyristor which is activated or deactivated by inputting a control signal to a control terminal, as well as other active elements.

According to an actuator drive circuit of the invention, two pairs of output transistors are employed; that is, a pair of power-side output transistors and another pair of ground-side output transistors. An actuator having an inductance is connected to a node between the pairs of power-side output transistors and another node between the pairs of ground-side output transistors. A drive current is caused to flow into an inductance through use of the two output transistor pairs, thereby driving the actuator. There is provided an overvoltage detection circuit for detecting whether a voltage appearing at the node of one output transistor pair is higher than a supply voltage or lower than a ground level by a predetermined level and whether a voltage appearing at the node of another output transistor pair is higher than a supply voltage or lower than a ground level by a predetermined level. The ground-side output transistor connected to the node where the voltage has exceeded the supply voltage by a predetermined level or the power-side output transistor connected to the node where the voltage has become lower than the ground-level by a predetermined level is activated. Therefore even when power is turned off; a circuit can be protected against an overvoltage.

A brushless drive circuit of the invention yields the following advantages.

(1) An electrolytic capacitor or a Zener diode, which would result in a cost hike, can be omitted. Even when an electrolytic capacitor or a Zener diode is used, the capacitance of the capacitor or diode can be reduced.

(2) Since the supply voltage does not increase, the upper limit of a voltage to be applied to the motor can be increased. Hence, there can be achieved a greater number of rotations and greater torque.

(3) When a motor is rotated by external force, an induced electromotive voltage develops in a drive coil, thereby attempting to increase the supply voltage. However, presence of the drive circuit of the invention inhibits an increase in the supply voltage, thereby preventing a breakage in withstand voltage of an electric component.

(4) Since the drive circuit operates by a counter-induced electromotive voltage or induced electromotive voltage developing in the drive coil, a working effect such as that mentioned above can be yielded even when the power of the motor or the power of the drive circuit is not turned on.

Further, according to the brushless motor drive circuit of the invention, a regenerative current flowing in reverse into the supply line of the motor can be suppressed significantly. Hence, there can be inhibited occurrence of an increase in the supply voltage of the motor, which would otherwise be caused at the time of a reverse rotation braking operation, thereby preventing a breakage in withstand voltage of the drive circuit and that of the power supply circuit.

By the related-art drive circuit, even when a power source or the like is released during the course of energization of a motor, a terminal voltage of a drive coil sometimes juts above a supply voltage or below a ground level. Since a regenerative current cannot return to a supply line, a high voltage develops momentarily, thereby breaking the withstand voltage of the drive circuit. The drive circuit of the invention can effectively operate against such an increase in the terminal voltage of the drive coil attributable to unexpected handling. Hence, the drive circuit is useful as a safeguard in all possible situations, such as manufacturing processes, processes for transporting finished products, an integration process, or other processes.

What is claimed is:

1. A drive circuit for an actuator having an inductance, wherein the actuator is driven by causing a drive current to flow into the inductance, the drive circuit comprising:

two pairs of output transistors, each pair including a power-side output transistor and a ground-side output transistor, the inductance of the actuator being connected to nodes formed between each pair of said power-side and ground-side output transistors;

an overvoltage detection circuit for detecting whether voltages appearing at said nodes formed between each pair of said power-side and ground-side output transistors are higher than a supply voltage by a first predetermined level and whether said voltages are lower than a ground level by a second predetermined level;

wherein an output from said overvoltage detection circuit activates one of the ground-side output transistors so that a voltage of the node connected to said around-side output transistor decreases when the voltage of the node connected to said ground-side output transistor exceeds the supply voltage by the first predetermined level, and an output from the overvoltage detection circuit activates one of the power-side output transistors so that a voltage of the node connected to said power-side output transistor increases when the voltage of the node connected to said power-side output transistor becomes lower than the ground level by the second predetermined level.

2. A drive circuit according to claim 1, wherein said overvoltage detection circuit includes a power-side detection transistor connected to a supply line and a ground-side detection transistor connected to a ground.

3. A drive circuit according to claim 1, wherein said actuator corresponds to any one of a brushless motor, a DC motor, a voice coil motor, and an electromagnetic actuator.

4. A drive circuit according to claim 1, wherein the actuator is a DC motor; a forward/reverse rotation circuit of said DC motor is constituted by said two pairs of the output transistor pairs; and said forward/reverse rotation circuit constitutes a regenerative current path.

5. A drive circuit for a brushless motor wherein the brushless motor is rotated by causing motor a drive current to flow into motor drive coils, the drive circuit comprising:

a plurality of pairs of output transistors, each pair including a power-side output transistor and a ground-side output transistor, different motor drive coils being connected to nodes formed between each pair of said power-side and ground-side output transistors;

an overvoltage detection circuit for detecting whether voltages appearing at said nodes formed between each pair of said power-side and ground-side output transistors are higher than a supply voltage by a first predetermined level and whether said voltages are lower than a ground level by a second predetermined level;

wherein an output from said overvoltage detection circuit activates one of the around-side output transistors so that a voltage of the node connected to said around-side output transistor decreases when the voltage of the node connected to said ground-side output transistor exceeds the supply voltage by the first predetermined level, and an output from the overvoltage detection circuit activates one of the power-side output transistors so that a voltage of the node connected to said power-side output transistor increases when the voltage of the node connected to said power-side output transistor becomes lower than the ground level by the second predetermined level.

6. A drive circuit according to claim 5, wherein said overvoltage detection circuit includes a power-side detection transistor connected to a supply line and a ground-side detection transistor connected to a ground line; and the node formed between each of said power-side and ground-side detection transistors is connected to an end of one of said different motor coils.

7. A drive circuit for a brushless motor having a sensor for detecting a rotary position of a rotor wherein the motor is rotationally driven by causing a motor drive current to flow into motor drive coils in accordance with a position signal detected by the sensor, and a an braking operation is performed by causing a motor drive current to flow in a direction in which the motor is to be rotated in reverse, said drive circuit comprising:

a motor drive current output section comprising a plurality of pairs of output transistors, each pair including a power-side output transistor and a ground-side output transistor, different motor drive coils being connected to nodes formed between each pair of said power-side and ground-side output transistors;

a drive current detection unit for detecting the motor drive current;

a comparator for comparing a predetermined reference current value with the motor drive current value detected by the drive current detection unit;

a current control switching section for activating or deactivating the motor drive current output section in accordance with a result of comparison performed by the comparator; and an overvoltage detection circuit for detecting whether a voltage appearing at each of said nodes formed between each pair of said power-side and around-side output transistors is higher than a supply voltage by a first predetermined level and whether or not said voltage is lower than a ground level by a second predetermined level;

wherein a regenerative current flow path is formed in the motor drive current output section by an output from the overvoltage detection circuit, an output from said overvoltage detection circuit activates one of the around-side output transistors so that a voltage of the node connected to said around-side output transistor decreases when the voltage of the node connected to said around-side output transistor exceeds the supply voltage by the first predetermined level, and an output from the overvoltage detection circuit activates one of the power-side output transistors so that a voltage of the node connected to said power-side output transistor increases when the voltage of the node connected to said power-side output transistor becomes lower than the ground level by the second predetermined level.

8. A drive circuit according to claim 7, wherein the motor drive coils constitutes three phases; and said overvoltage detection circuit detects that a voltage appearing at a terminal of one motor drive coil from among two motor drive coils of two arbitrary phases is higher than the supply voltage by the first predetermined level and that a voltage appearing at the remaining motor drive coil is lower than the ground level by the second predetermined level.

9. A drive circuit according to claim 7, wherein the motor drive current output section has a diode for regenerative current, and the diode forms a regenerative current path in the motor drive current output section.

10. A drive circuit according to claim 7, wherein a power-side output transistor or ground-side output transistor of the motor drive current output section is temporarily suspended by an output from the overvoltage detection circuit.

11. A motor drive circuit according to claim 7, wherein a current control switch activates or deactivates a motor drive current output section in accordance with a result of comparison performed by the comparator at a time of braking operation of a motor, and a regenerative current path is formed in the motor drive current output section by an output from the overvoltage detection circuit.

* * * * *